(12) United States Patent
Kim et al.

(10) Patent No.: US 10,122,562 B2
(45) Date of Patent: Nov. 6, 2018

(54) METHOD AND APPARATUS FOR TRANSMITTING AND RECEIVING DATA IN MULTICARRIER COMMUNICATION SYSTEM

(71) Applicants: Samsung Electronics Co., Ltd., Suwon-si, Gyeonggi-do (KR); Industry-Academic Cooperation Foundation, Yonsei University, Seoul (KR)

(72) Inventors: Chan-Hong Kim, Hwaseong-si (KR); Soo-Yong Choi, Seoul (KR); Sang-Woo Kim, Seoul (KR); Hyung-Ju Nam, Seoul (KR); Moon-Chang Choi, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 335 days.

(21) Appl. No.: 14/263,232

(22) Filed: Apr. 28, 2014

(65) Prior Publication Data

US 2014/0321524 A1    Oct. 30, 2014

(30) Foreign Application Priority Data

Apr. 26, 2013 (KR) .......................... 10-2013-0046407

(51) Int. Cl.
*H04B 7/10* (2017.01)
*H04W 4/00* (2018.01)
(Continued)

(52) U.S. Cl.
CPC ........ *H04L 27/2647* (2013.01); *H04L 5/0007* (2013.01); *H04L 5/0023* (2013.01);
(Continued)

(58) Field of Classification Search
CPC . H04L 27/2626; H04L 5/0007; H04L 5/0023; H04L 5/0048; H04L 27/265;
(Continued)

(56) References Cited

U.S. PATENT DOCUMENTS

2005/0169395 A1* 8/2005 Monta ................. H04L 27/2628
                                                        375/261
2005/0262176 A1* 11/2005 Lou .............................. 708/300
(Continued)

OTHER PUBLICATIONS

Alphan Sahin et al., 'A Survey on Prototype Filter Design for Filter Bank Based Multicarrier Communications', In Proceedings of CoRR, Dec. 14, 2012, pp. 1-22.

*Primary Examiner* — Sam K Ahn
*Assistant Examiner* — Sarah Hassan
(74) *Attorney, Agent, or Firm* — Jefferson IP Law, LLP

(57) ABSTRACT

A method and an apparatus for transmitting and receiving data in a filter bank based multicarrier communication system are provided. The method includes receiving a plurality of data blocks and performing an Inverse Fast Fourier Transform (IFFT) operation on the plurality of data blocks, multiplying the plurality of data blocks on which IFFT has been performed and time axis filter coefficients, and transmitting a result obtained by adding the plurality of multiplied data blocks as a multi carrier signal.

21 Claims, 12 Drawing Sheets

(51) Int. Cl.
*H04L 27/26* (2006.01)
*H04L 25/03* (2006.01)
*H04L 5/00* (2006.01)

(52) U.S. Cl.
CPC .. *H04L 25/03159* (2013.01); *H04L 25/03821* (2013.01); *H04L 27/264* (2013.01); *H04L 27/2626* (2013.01); *H04L 2025/03414* (2013.01)

(58) Field of Classification Search
CPC ... H04L 27/2601; H04L 5/005; H04L 1/0045; H04L 2001/0093; H04L 25/0232
USPC .......................................... 375/347; 370/338
See application file for complete search history.

(56) References Cited

U.S. PATENT DOCUMENTS

| | | | |
|---|---|---|---|
| 2005/0271152 A1* | 12/2005 | Kim et al. | 375/260 |
| 2006/0109897 A1* | 5/2006 | Guo et al. | 375/232 |
| 2009/0046787 A1* | 2/2009 | Uesugi et al. | 375/260 |
| 2010/0183100 A1 | 7/2010 | Shimezawa et al. | |
| 2011/0142152 A1* | 6/2011 | Bellanger | H04L 27/2634 375/261 |
| 2012/0189036 A1 | 7/2012 | Bellanger | |
| 2015/0092885 A1* | 4/2015 | Li et al. | 375/296 |

\* cited by examiner

FIG.13

Complexity of FBMC structure according to the related art

| | Transmitter side | Receiver side | Sum |
|---|---|---|---|
| iFFT / FFT | $O(4M \log_2(4M))$ | $O(4M \log_2(4M))$ | $O(4M \log_2(4M))$ |
| multiplication | 7M | 11M | 18M |
| Addition | 6M | 3M | 9M |
| Memory | 6M | 3M | 9M |

80% reduce
50% reduce
33% reduce
33% reduce

Complexity of FBMC structure according to an embodiment of the present disclosure

| | Transmitter side | Receiver side | Sum |
|---|---|---|---|
| iFFT / FFT | $O(M \log_2 M)$ | $O(M \log_2 M)$ | $O(M \log_2 M)$ |
| multiplication | 4M | 5M | 9M |
| Addition | 3M | 3M | 6M |
| Memory | 3M | 3M | 6M |

METHOD AND APPARATUS FOR TRANSMITTING AND RECEIVING DATA IN MULTICARRIER COMMUNICATION SYSTEM

CROSS-REFERENCE TO RELATED APPLICATION(S)

This application claims the benefit under 35 U.S.C. § 119(a) of a Korean patent application filed on Apr. 26, 2013 in the Korean Intellectual Property Office, and assigned Serial No. 10-2013-0046407, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD., and 2) Industry-Academic Cooperation Foundation, Yonsei University.

TECHNICAL FIELD

The present disclosure relates to a method and an apparatus for transmitting and receiving data in a filter bank based multicarrier communication system.

BACKGROUND

Processing signals of various systems include channel equalization. The channel equalization is used to compensate a fading effect of a multipath channel which becomes a fundamental problem in communication systems.

A variety of channel equalization techniques have been developed for the use with single carrier transmission systems according to the related art and the latest Code Division Multiple Access (CDMA) systems. An interest in multi carrier transmission techniques in which dedicated channel equalization techniques are to be used has been higher as a result of an increase in data rates and signal bandwidths in new future systems. In the multi carrier transmission system, a transmitted high rate data stream is divided into a plurality of low rate sub-channels which are partially overlapped in a frequency domain.

For multiplexing and demultiplexing of the sub-channels, various techniques have been used. For example, Orthogonal Frequency Division Multiplexing (OFDM) techniques and Filter Bank based Multicarrier (FBMC) techniques have been known. The FBMC techniques may be referred to as Discrete Wavelet Multitone (DWMT) techniques.

In the OFDM system and Discrete Multitone (DMT) system which is a baseband version thereof, the high rate data stream is divided into the plurality of the low rate stream simultaneously transmitted through a plurality of sub-carriers in order to reduce dispersion relative to a time due to multipath delay spread. The sub-channels are multiplexed and demultiplexed through a pair of Inverse Fast Fourier Transform (IFFT)-Fast Fourier Transform (FFT) operations. In OFDM and DMT systems, a time domain guard interval and simple 1-tap frequency domain equalization applied to all OFDM symbols are generally used for the channel equalization. In a guard time, the OFDM symbol is cyclicly extended so as to avoid inter-carrier interference.

The OFDM and DMT systems are very steady in a channel equalization viewpoint. Meanwhile, as described below, a study on the FBMC system has been actively performed because of an advantage which is obtained by the FBMC system.

The FBMC system according to the related art includes a transmitting and receiving method based on a Polyphase Network (PPN) structure in a time axis after the IFFT and a transmitting and receiving method based on a frequency spreader and an overlap/sum structure in a frequency axis before the IFFT.

The transmitting and receiving method based on the PPN structure implements a filtering using a convolution operation of the time axis to a sum of a weighted sum of M lengths by utilizing the PPN and then implements an offset-Quadrature Amplitude Modulation (QAM) by applying two PPN modules through a time difference. An equalizer is used in a time axis in the receiver by performing a filtering of the time axis.

The transmitting and receiving method based on the frequency spreader and overlap/sum structure is performed in the transceiver of the FBMC system as illustrated in FIGS. 1 to 3.

FIG. 1 illustrates a configuration of a transmitter in a FBMC system according to the related art. FIG. 2 illustrates a configuration of a receiver of an FBMC system according to the related art. FIG. 3 illustrates a detailed configuration of a transmitter according to the related art.

Referring to FIG. 1, the transmitter in the FBMC system according to the related art performs IFFT of a (K×M) length after performing filtering by an oversampling and prototype filter in the frequency axis before the IFFT and then performs a repeated transmission using an adder and a memory.

Referring to FIG. 2, the receiver in the FBMC system according to the related art performs a frequency axis filtering through a frequency de-spreader so as to increase a size of FFT by (K×M). A frequency axis one-tap equalizer is performed in the receiver by performing the filtering in the frequency axis.

Referring to FIG. 3, the receiver in the FBMC system according to the related art is configured with an IFFT unit 10 and a Parallel-Serial (P/S) conversion unit 20.

The IFFT unit 10 receives an input of a plurality of data. One piece of data di(mM) among the plurality of pieces data is spread into KM pieces of data before the IFFT unit 10 and is referred to as "weighted frequency spreading". The data di(mM) spread into KM pieces of data is multiplied by (2K−1) number of frequency axis filter coefficients. The data di(mM) multiplied by the (2K−1) number of frequency axis filter coefficients is inverse fast Fourier transformed by the IFFT unit 10. The P/S conversion unit 20 receives an input of each data inverse fast Fourier transformed in parallel and outputs the data in series.

Consequentially, the size of the IFFT increases by a multiple of prototype filter order K so as to increase a complexity. The structure of the transmitter is represented to be symmetrical in the receiver so that a size of FFT increases by a multiple of K and a complexity increases in the receiver.

The PPN based transmitting and receiving structure has an advantage in that sizes of IFFT and FFT are maintained as M, but has a disadvantage in that an equalization process is to be performed in the time axis in the receiver due to the filtering in the time axis.

Further, the frequency spreader and overlap/sum structure based transmitting and receiving structure has an advantage in that the one-tap frequency axis equalizer can be used in the receiver by the filtering in the frequency axis, but has a disadvantage in that sizes of IFFT and FFT increase by K-fold so as to increase a complexity.

Therefore, both the PPN structure based transmitting and receiving structure and frequency spreader and overlap/sum structure based transmitting and receiving structure use IFFT and FFT of a conventional M size (or length) and is difficult to interwork with the OFDM system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect present disclosure provides a method and an apparatus for transmitting and receiving data so as to allow the sizes of Inverse Fast Fourier Transform (IFFT) and Fast Fourier Transform (FFT) to be maintained as M in the multi carrier communication system.

Another aspect of the present disclosure provides a method and an apparatus for transmitting and receiving data so as to perform a filtering in the frequency axis in the multi carrier communication system.

In accordance with an aspect of the present disclosure, a method of transmitting data in a multi carrier communication system is provided. The method includes receiving a plurality of data blocks, performing an IFFT operation on the plurality of data blocks, multiplying the plurality of data blocks on which IFFT has been performed and time axis filter coefficients; and transmitting a result obtained by adding the plurality of multiplied data blocks as a multi carrier signal.

In accordance with another aspect of the present disclosure, a method of receiving data in a multi carrier communication system is provided. The method incldues receiving a plurality of data blocks from a transmitter side, multiplying the plurality of the received data blocks and time axis filter coefficients, adding the time axis filter coefficients to a plurality of the multiplied data blocks, generating a FFT input, and performing an FFT operation with respect to the FFT input.

In accordance with another aspect of the present disclosure, an apparatus of transmitting data in a multi carrier communication system is provided. The apparatus includes a filter unit configured to receive a plurality of data blocks, to perform an IFFT operation, to multiply the plurality of data blocks on which IFFT has been performed and time axis filter coefficients, and to output a result obtained by adding the plurality of multiplied data blocks as parallel data, and a parallel-serial converter configured to generate a multi carrier signal converting the parallel data into serial data.

In accordance with another aspect of the present disclosure, an apparatus for receiving data in a multi carrier communication system is provided. The apparatus includes a filter unit configured to multiply a plurality of data blocks received from a transmitter side and time axis filter coefficients, and to add the plurality of multiplied data blocks in the unit of a block, and an FFT unit configured to perform a FFT operation with respect to a result obtained by adding the data blocks by the filter unit.

According to the present disclosure, the filtering in the frequency axis is implemented through a weighted sum in the time axis by utilizing a repetition characteristic of IFFT and FFT so that the sizes of IFFT and FFT are fixed as a size (or length) of an input data block. Simultaneously, the receiver may apply the one-tap equalizer in the frequency axis. Therefore, a complexity of the transceiver is to be reduced and a high compatibility with the OFDM system can be obtained.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 is a view illustrating a comparison of a complexity between a configuration of a transceiver in a FBMC system according to the related art and a configuration of a transceiver in an FBMC system according to an embodiment of the present disclosure in a form of a table.

Throughout the drawings, it should be noted that like reference numbers are used to depict the same or similar elements, features, and structures.

DETAILED DESCRIPTION

Figure 1:
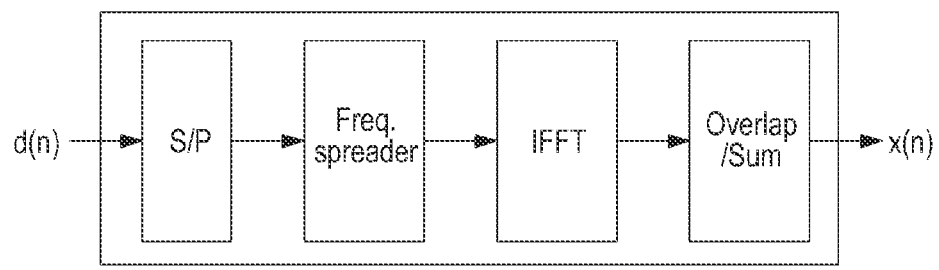
FIG. 1 illustrates a configuration of a transmitter in a Filter Bank based Multicarrier (FBMC) system according to the related art.
Figure 2:
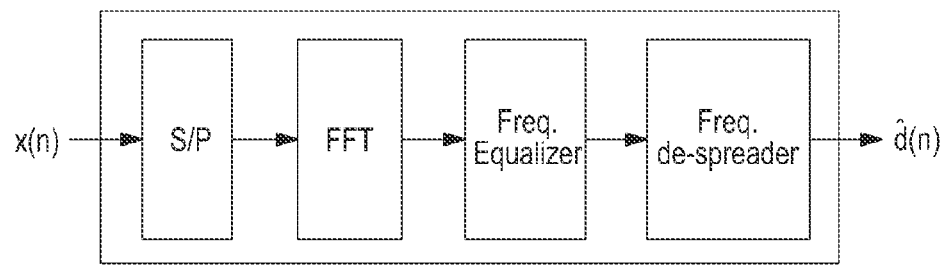
FIG. 2 illustrates a configuration of a receiver in an FBMC system according to the related art.
Figure 3:
FIG. 3 illustrates a detailed configuration of a transmitter according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure a scheme for solving a problem of a high complexity of a transceiver in a filter bank based multicarrier communication system according to the related art, and a low compatibility with an Orthogonal Frequency Division Multiplexing (OFDM) system is provided.

According to various embodiments of the present disclosure, a filter bank based multi carrier communication system provides a transmitting and receiving structure in which the sizes of Inverse Fast Fourier Transform (IFFT) and Fast Fourier Transform (FFT) are fixed as a length of input data block regardless of a prototype filter order.

Further, according to various embodiments of the present disclosure, in the filter bank based multi carrier communication system, a transmitting and receiving structure in which a plurality of data blocks on which IFFT has been performed and time axis filter coefficients implement the frequency filtering through a multiplication is provided.

According to various embodiments of the present disclosure, the filter bank based multi carrier communication system described below provides a transmitting and receiving structure in which the frequency filtering is performed by adding the multiplied result through a weighted sum in the time axis by utilizing a repetition characteristic of IFFT and FFT according to the length of the fixed data block.

Hereinafter, various embodiments of the present disclosure will be described in detailed with reference to the accompanying drawings. In the following description of various embodiments of the present disclosure, a detailed description of known functions or configurations incorporated herein will be omitted when it is determined that the detailed description thereof may unnecessarily obscure the subject matter of the present disclosure.

Figure 4:
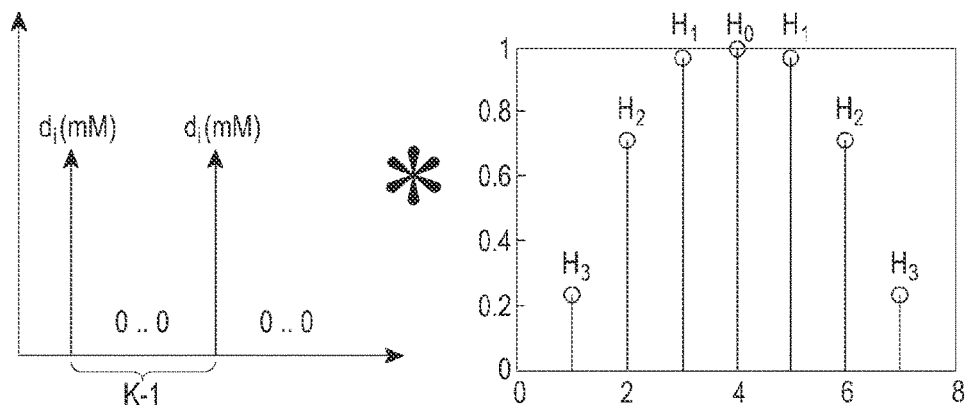
FIG. 4 illustrates an operation of a frequency spreader according to an embodiment of the present disclosure.

FIG. 4 illustrates an operation of a frequency spreader according to an embodiment of the present disclosure.

Referring to FIG. 4, a signal including (K−1) 0s inserted between every piece of data in a frequency axis is illustrated on the left side, and a frequency response of a prototype filter is illustrated on the right side.

In a frequency spreader, a filtering may be represented by a convolution operation * of the signal including (K−1) 0s inserted between every piece of data in the frequency axis and filter coefficients in the frequency axis.

After filtering, when an IFFT operation is interpreted as a convolution theorem, a convolution theorem in the frequency axis is converted into a multiple operation in the time axis. For example, as a result of the 0s inserted between every piece of data, the IFFT output block of existing data is repeated by (K−1) number of times, and the IFFT operation can be interpreted as a weighted sum operation in the unit of K number of block units and KM number of filter coefficients in the time axis. On the basis of a characteristic as interpreted above, the transmitting and receiving structure according to various embodiments of the present disclosure is proposed.

Figure 5:
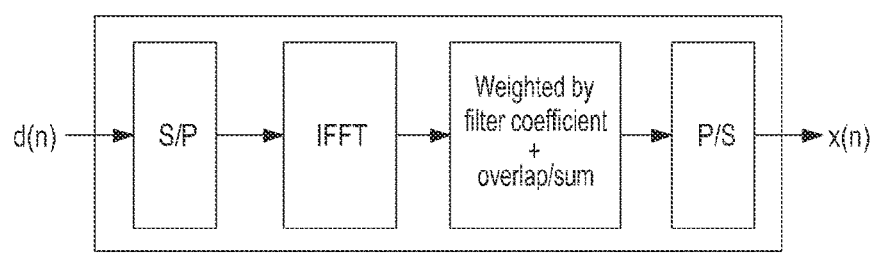
FIG. 5 illustrates a configuration of a transmitter in an FBMC system according to an embodiment of the present disclosure.

FIG. 5 illustrates a configuration of a transmitter in a Filter Bank based Multicarrier (FBMC) system according to an embodiment of the present disclosure.

Referring to FIG. 5, the transmitter performs a time axis filtering of a block unit after the IFFT operation. Accordingly, in view of the IFFT size, the size of the data block is fixed to M similarly to a OFDM system according to the related art, and includes an adder or overlap/sum unit which operates a weighted sum in the time axis with respect to a data block multiplied by (K×M) number of filter orders by using an IFFT repetition characteristic between an IFFT unit and a P/S unit so as to allow a transmission of an M sized signal.

Figure 6:
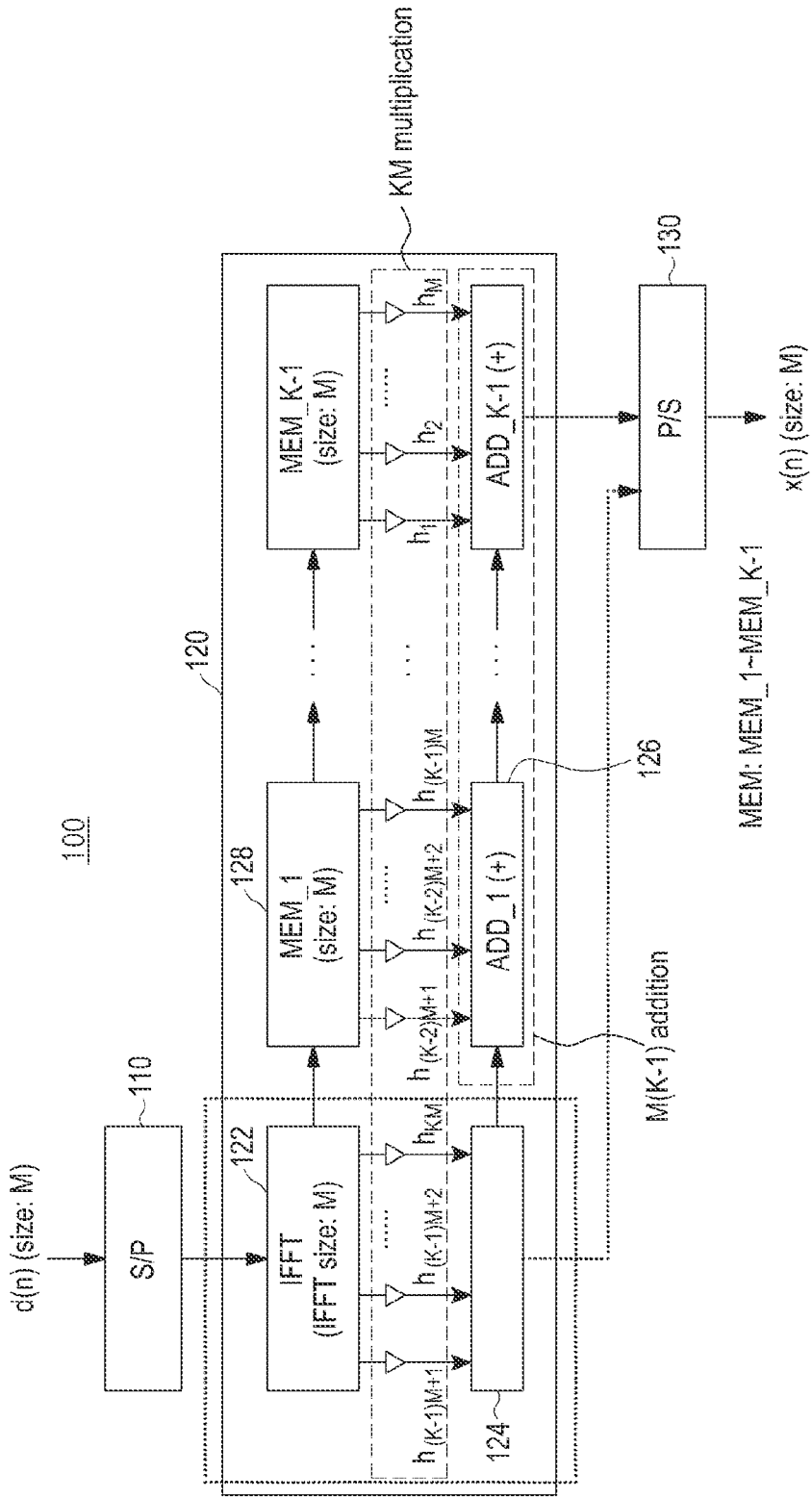
FIG. 6 illustrates a detailed configuration of a transmitter in an FBMC system according to an embodiment of the present disclosure.

FIG. 6 illustrates a detailed configuration of a transmitter in an FBMC system according to an embodiment of the present disclosure.

Referring to FIG. 6, a filtering is performed through a weighted sum operation in the unit of K number of block units in the time axis by utilizing the repetition characteristic in which the frequency spreader is interpreted as described with reference to FIG. 4.

For example, a transmitter 100 includes an S/P conversion unit 110, a filter unit 120, and a P/S conversion unit 130.

The S/P conversion unit 110 serially receives an input of data d(n) (or a symbol to be transmitted). The sequentially input data is provided to the filter unit 120 by being configured with a data block having a size identical to the size M of IFFT in the filter unit 120 through the S/P unit 110. Herein, the size of the data block may be defined as a length of data, a number of data, a number of subcarriers, and/or the like.

The filter unit 120 performs a filtering through a weighted sum operation in the unit of K number of block units in the time axis by utilizing the repetition characteristic of IFFT. A result obtained by the filtering is identical to a filtering in a frequency axis. K may be a filter order of a prototype.

The filter unit 120 may include an IFFT unit 122, a buffer 124, (K−1) number of adders (e.g., ADD_1~ADD_K−1) 126, and a memory 128 (e.g., MEM_1~MEM_K−1.

The IFFT unit 122 sequentially receives an input of K number of data blocks of which the size is M, from the S/P unit 110. The IFFT unit sequentially IFFT operates the sequentially received K number of data blocks.

The memory 128 includes (K−1) number of memory blocks (e.g., MEM_1~MEM_K−1). Each size of the memory block is identical to at least the IFFT size. Each memory block stores data blocks on which IFFT has been performed by the IFFT unit 122 in an operated order. For example, the data block on which IFFT has been performed is sequentially stored from the (K−1)$^{th}$ number of memory blocks (MEM_K−1). In this event, a last data block on which IFFT has been performed is not stored in the (K−1) number of memory blocks (e.g., MEM_K−1~MEM_K−1) and when the IFFT operation is finished, the last data block on which IFF has been performed is output without change.

For K block unit weighted sum in the time axis, data blocks respectively stored in the (K−1) number of memory blocks (e.g., MEM_K−1~MEM_K−1) are simultaneously output from the (K−1) number of memory blocks (e.g., MEM_K−1~MEM_K−1) in parallel and are multiplied by (K(M−1)) number of time axis filter coefficients in the unit of a block. The last data block on which IFFT has been performed is output from the IFFT operation unit 122 and is multiplied by M number of time axis filter coefficients. For example, all the data blocks on which IFFT has been performed are multiplied by (K×M) number of time axis filter coefficients in the unit of a block.

The buffer 124 temporarily stores the data block multiplied by the M time axis filter coefficients by the IFFT unit 122.

The (K−1) number of adders (e.g., ADD_1~ADD_K−1) 126 add and overlap (K×M) number of time axis filter coefficients to the data blocks on which IFFT has been performed multiplied in the unit of a block.

Specifically, the (K−1) number of adders (e.g., ADD_1~DD_K−1) 126 are output from the (K−1) number of memory blocks (e.g., MEM_K−1~MEM_K−1) in parallel and add the (K(M−1)) number of time axis filter coefficients to the multiplied data blocks of the block unit. The added data blocks are added to a data block stored in the buffer 124 by a first adder (ADD_1) among the (K−1) number of adders (e.g., ADD_1~ADD_K−1) 126. Eventually, the KM number of time axis filter coefficients and all data blocks multiplied in the unit of a block are converted into an overlapped FBMC signal through an addition operation of the block unit, and then are transmitted to a receiver side. According to various embodiments of the present disclosure, the overlap/sum structure may be implemented by the addition operation of the block unit.

In accordance with an operation process, K data blocks having a size of M are subject to IFFT, respectively, and are then sequentially stored in memories from the (K−1)th memory. Then, a repeated transmission is performed through a block unit additional operation so that a block unit is multiplied by the KM number of time axis filter coefficients and the overlap/sum structure is implemented so that a FBMC signal x(n) is transmitted. Herein, a filter coefficient in the time axis has different values depending on a filter order K.

In the FBMC transmitter as illustrated in FIG. 6, only a part which is displayed with a dotted line is used and is identical to an OFDM transmitting and receiving structure when all filter coefficients are 1. As a result, the FBMC transmitter according to various embodiments of the present disclosure has a high compatibility with the OFDM system according to the related art.

Figure 7:
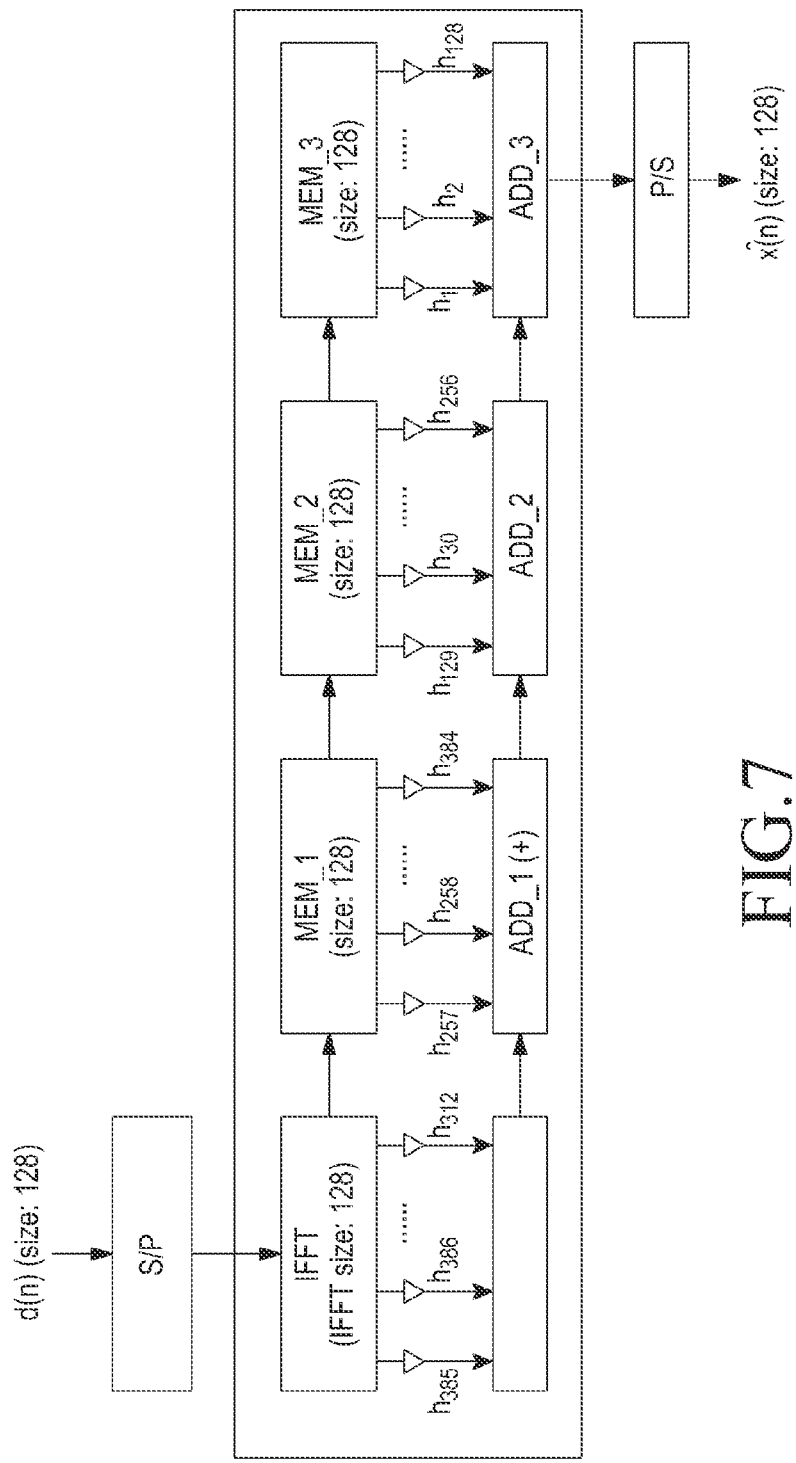
FIG. 7 illustrates an example of a transmitter operation in an FBMC system such as, for example, the FBMC system illustrated in FIG. 6 according to an embodiment of the present disclosure.

FIG. 7 illustrates an example of a transmitter operation in an FBMC system such as, for example, the FBMC system illustrated in FIG. 6 according to an embodiment of the present disclosure.

Referring to FIG. 7, a structure of a transmitter in an environment that a prototype filter order K is 4 and a length (size) M of a data block is 128 is represented. In this event, 128 size of IFFT is performed on each input of a data block (or an input symbol). Therefore, 128 IFFT outputs and time prototype filter coefficients are subject to a multiplication in the unit of a block having a length of 128.

For example, a multiplication of a prototype filter coefficient with respect to a first data block (1$^{ST}$ block output) output from a memory MEM 3 is 1$^{st}$ IFFT output×filter coefficient (1~128), a multiplication of a prototype filter coefficient with respect to a second data block (2$^{nd}$ block output) output from a memory MEM2 is 2$^{nd}$ IFFT output× filter coefficient (129~256), and a multiplication of a prototype filter coefficient with respect to a third data block (3$^{rd}$ block output) output from a memory MEM 1 is 3$^{rd}$ IFFT output×filter coefficient (257~384). Further, a multiplication of a prototype filter coefficient with respect to a fourth data block (4$^{th}$ block output) output from the IFFT unit is 4$^{th}$ IFFT output×filter coefficient (385~512).

Then, a result obtained by the multiplication with respect to each data block is subjected to an addition operation by the unit of a block having a length of 128, and this may be represented as 1$^{st}$ block output+2$^{nd}$ block output+3$^{rd}$ block output+4$^{th}$ block output.

Figure 8:
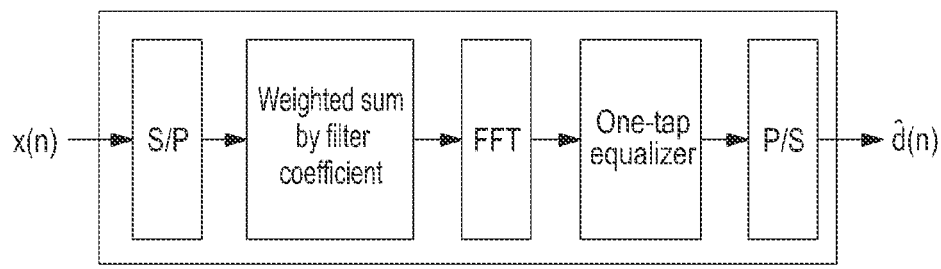
FIG. 8 illustrates a configuration of a receiver in an FBMC system according to an embodiment of the present disclosure.

FIG. 8 illustrates a configuration of a receiver in an FBMC system according to an embodiment of the present disclosure.

Referring to FIG. 8, an FBMC receiver performs a time axis filtering in the unit of a block after the IFFT operation so that an FFT size is fixed and a frequency axis one-tap equalization process is performed after the FFT operation.

Figure 9:
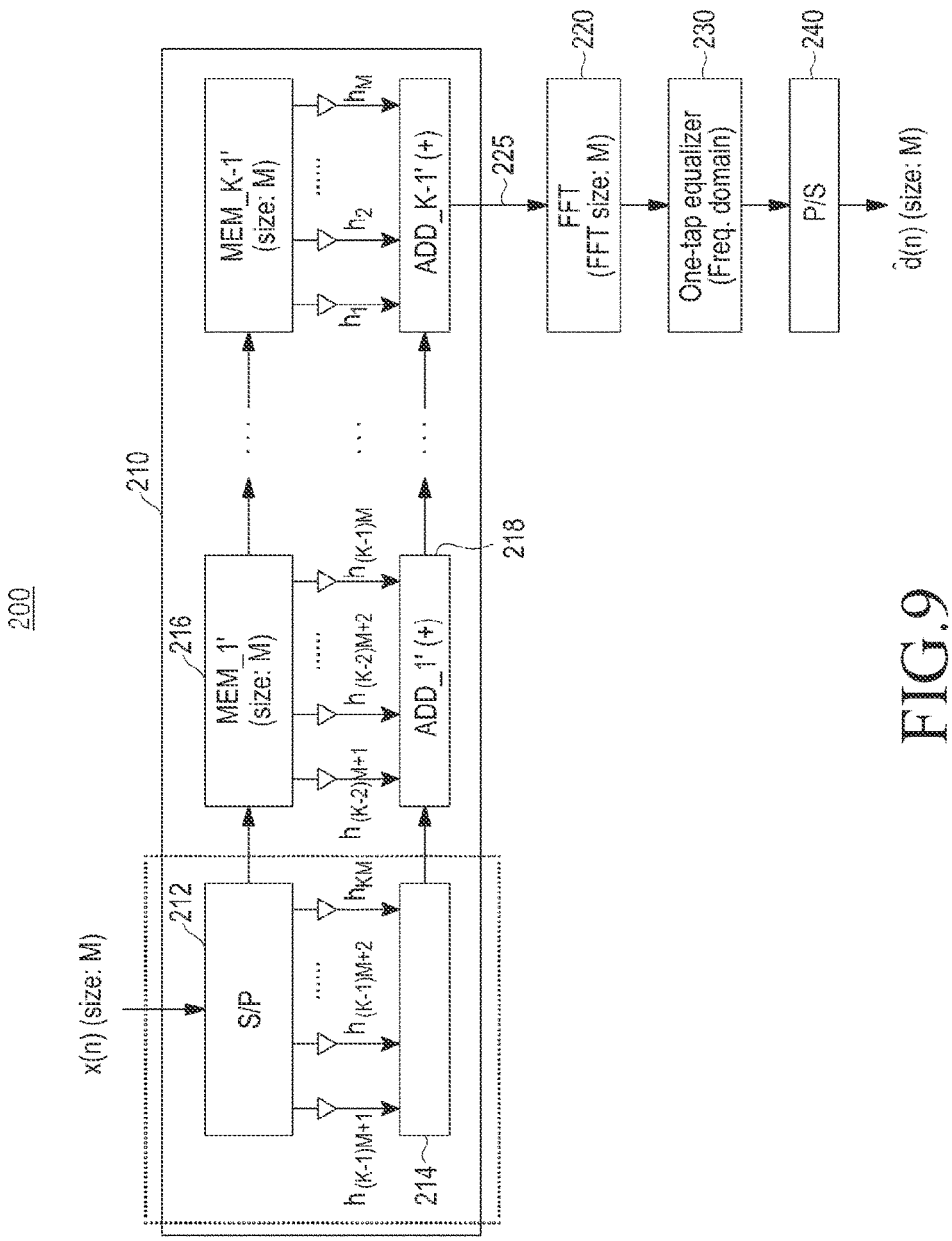
FIG. 9 illustrates a detailed configuration of a receiver in an FBMC system according to an embodiment of the present disclosure.

FIG. 9 illustrates a detailed configuration of a receiver in an FBMC system according to an embodiment of the present disclosure.

Referring to FIG. 9, the FBMC receiver 200 includes a receiver side filter unit 210, an FFT unit 220, the one-tap equalizer 230, and a P/S unit 240.

The receiver side filter unit 210 adds a result obtained by multiplying K number of block units through weighted sum in the time axis by utilizing a time axis repetition characteristic of FFT according to a length of the fixed data block so as to perform a frequency axis filtering. The receiver side filter unit 210 may include an input unit 212, a buffer 214, a memory (e.g., MEM': MEM_1'~MEM_K−1') 216, and (K−1) number of adders (e.g., ADD_1'~ADD_K−1') 218.

The input unit 212 serially receives an input of an FBMC signal x(n) received from the FBMC transmitter 100 and outputs the FBMC signal in parallel. For example, the input unit may be implemented as a parallel to serial converter. The FBMC signal x(n) output in parallel at the same time through the input unit 212 is formed as a data block. Therefore, the input unit 212 is configured as a multiple pieces of reception data in the unit of a block. The multiple pieces of reception data output through the input unit 212 is sequentially stored in the memory (e.g., MEM': MEM_1'~MEM_K−1') 216.

Each reception data block stored in the memory (e.g., MEM': MEM_1'~MEM_K−1') 216 and a data block last received by the input unit 212 are multiplied by (K×M) number of time axis filter coefficients in the unit of a block. In this event, data blocks multiplied by ((K−1)×M) number of time axis filter coefficients in the unit of a block are respectively output to the (K−1) number of adders (ADD_1'~ADD_K−1') 218 and a last reception data block on which IFFT has been performed is output to the buffer 214 in the receiver side filter unit 210.

Reception data blocks and remaining reception data blocks which are stored in the buffer 214 are added by the (K−1) number of adders (e.g., ADD_1'~ADD_K−1') 218 in the unit of a block and the FFT input 225 having a size of M is generated. FFT is performed on FFT input 225 having a size of M through the FFT unit 220 and the result of the FFT operation is reconstructed as a signal $\hat{d}(\dot{n})$ having a size of M through an equalization process by a one-tap equalizer 230 in the frequency axis and a parallel to serial conversion process by the parallel to serial conversion unit 240.

In accordance with the operation process, the reception data block having a size of M is sequentially stored from the $(K-1)^{th}$ memory MEM_K-1' and then is multiplied by KM number of time axis filter coefficients in the unit of a block. Then, the FFT input 225 having a size of M is generated and the generated FFT input is subject to an FFT operation having a size of M. Then, the FFT input 225 which has been subject to the FFT operation having a size of M is reconstructed as a signal $\hat{d}(\dot{n})$ by using the one-tap equalizer 230 in the frequency axis.

In the FBMC receiver structure as illustrated in FIG. 9, only a part which is displayed with a dotted line is used and is identical to an OFDM transmitting and receiving structure when all filter coefficients are 1. As a result, the FBMC receiver according to various embodiments of the present disclosure has a high compatibility with the OFDM system according to the related art.

Figure 10:
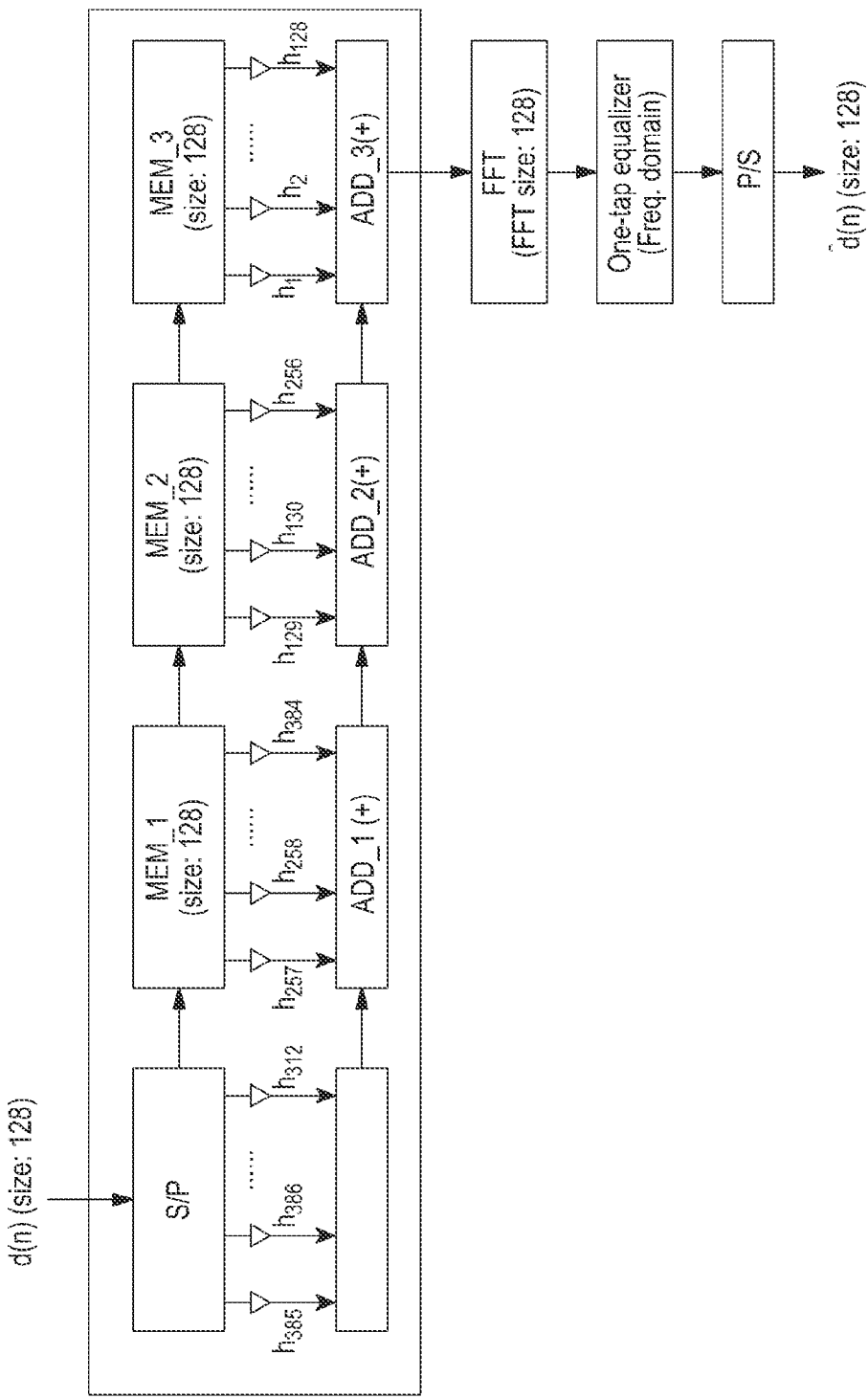
FIG. 10 illustrates an example of a receiver operation in an FBMC system such as, for example, the FBMC system illustrated in FIG. 9 according to an embodiment of the present disclosure.

FIG. 10 illustrates an example of a receiver operation in an FBMC system such as, for example, the FBMC system illustrated in FIG. 9.

Referring to FIG. 10, an example of the receiver operation in a condition identical to the transmitter as illustrated in FIG. 7 is provided.

Referring to FIG. 10, a multiplication of received data blocks and time axis prototype filter coefficient in the unit of a block having a length of 128 will be described below.

block unit multiplication with respect to $1^{st}$ block: $1^{st}$ reception data block×filter coefficient (1~128)
block unit multiplication with respect to $2^{nd}$ block: $2^{nd}$ reception data block×filter coefficient (129~256)
block unit multiplication with respect to $3^{rd}$ block: $3^{rd}$ reception data block×filter coefficient (257~384)
block unit multiplication with respect to $4^{th}$ block: $4^{th}$ reception data block×filter coefficient (385~512)

A summation of the unit of a block having a length of 128 with respect to an operation value of each block is $1^{st}$ block output+$2^{nd}$ block output+$3^{rd}$ block output+$4^{th}$ block output and 128 of the generated FFT inputs are subjected to the FFT operation and then the one-tap equalization process is performed.

Figure 11:
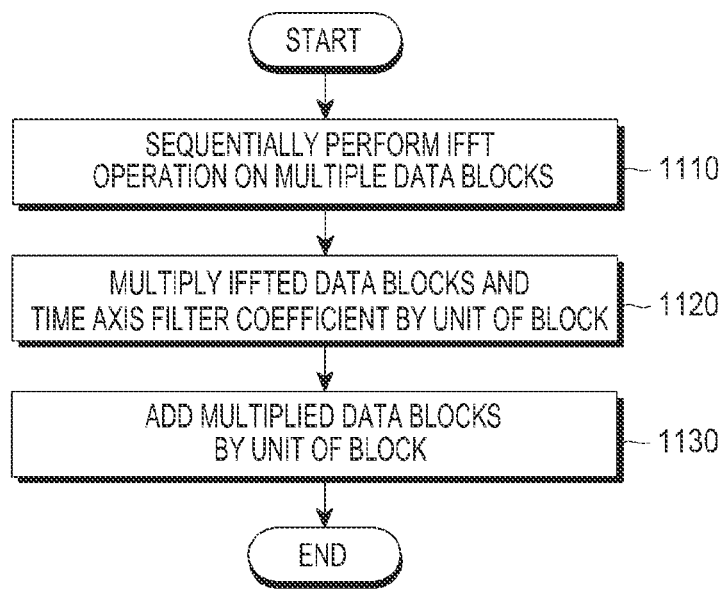
FIG. 11 is a flow chart illustrating a data transmitting method in a transmitter of an FBMC system according to an embodiment of the present disclosure.

FIG. 11 is a flow chart illustrating a data transmitting method in a transmitter of an FBMC system according to an embodiment of the present disclosure.

Referring to FIG. 11, at operation 1110, the transmitter sequentially performs IFFT on the K number of data blocks having a size of M and stores the data blocks in the (K-1) number of memories in the unit of a block.

At operation 1120, the transmitter multiplies all data blocks on which IFFT has been performed and (K×M) number of time axis filter coefficients in the unit of a block.

At operation 1130, the transmitter adds the multiplied data blocks in the unit of a block. The transmitter generates an FBMC signal in order to implement an overlap/sum structure, and then transmits the FBMC signal to the receiver.

Figure 12:
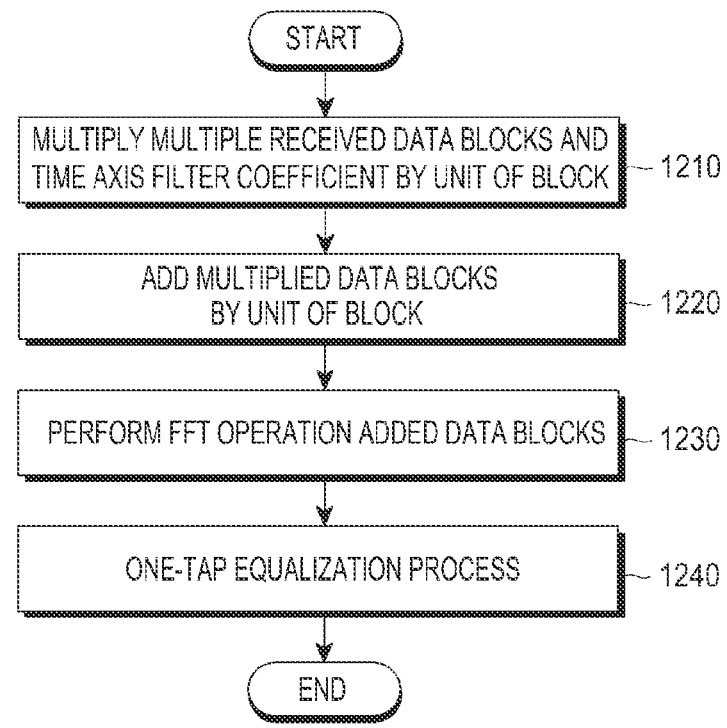
FIG. 12 is a flow chart illustrating a data receiving method in a receiver of an FBMC system according to an embodiment of the present disclosure.

FIG. 12 is a flow chart illustrating a data receiving method in a receiver of an FBMC system according to an embodiment of the present disclosure.

Referring to FIG. 12, first, a receiver divides an FBMC signal received from the transmitter of FBMC into M number of data blocks having a size of M and sequentially stores each reception data block in the (K-1) number of memories.

At operation 1210, the receiver performs a block unit multiplication of KM number of time axis filter coefficients.

At operation 1220, the receiver adds the multiplied data blocks in the unit of a block.

At operation 1230, the transmitter performs FFT on the added data blocks and generates the FFT input having a size of M.

At operation 1240, the transmitter is subject to the FFT operation having a size of M and performs an equalization process using the one-tap equalizer in the frequency axis.

FIG. 13 is a view illustrating a comparison of a complexity between a configuration of a transceiver in an FBMC system according to the related art and a configuration of a transceiver in a FBMC system according to an embodiment of the present disclosure in a form of a table.

Referring to FIG. 13, it is noted through performance test in a case in which a filter order is 4 that a complexity of IFFT and FFT in an FBMC transmission/reception structure according to an embodiment of the present disclosure is reduced by 80% from a FBMC transmission/reception structure according to the related art, a complexity of a multiplication operation of an IFFT and FFT calculated data block and a time axis filter coefficient is reduced by 50% from the FBMC transmission/reception structure according to the related art, a complexity of an addition operation is reduced by 33% from the FBMC transmission/reception structure according to the related art, and a memory size is reduced by 33% from the FBMC transmission/reception structure according to the related art.

Figure 14:
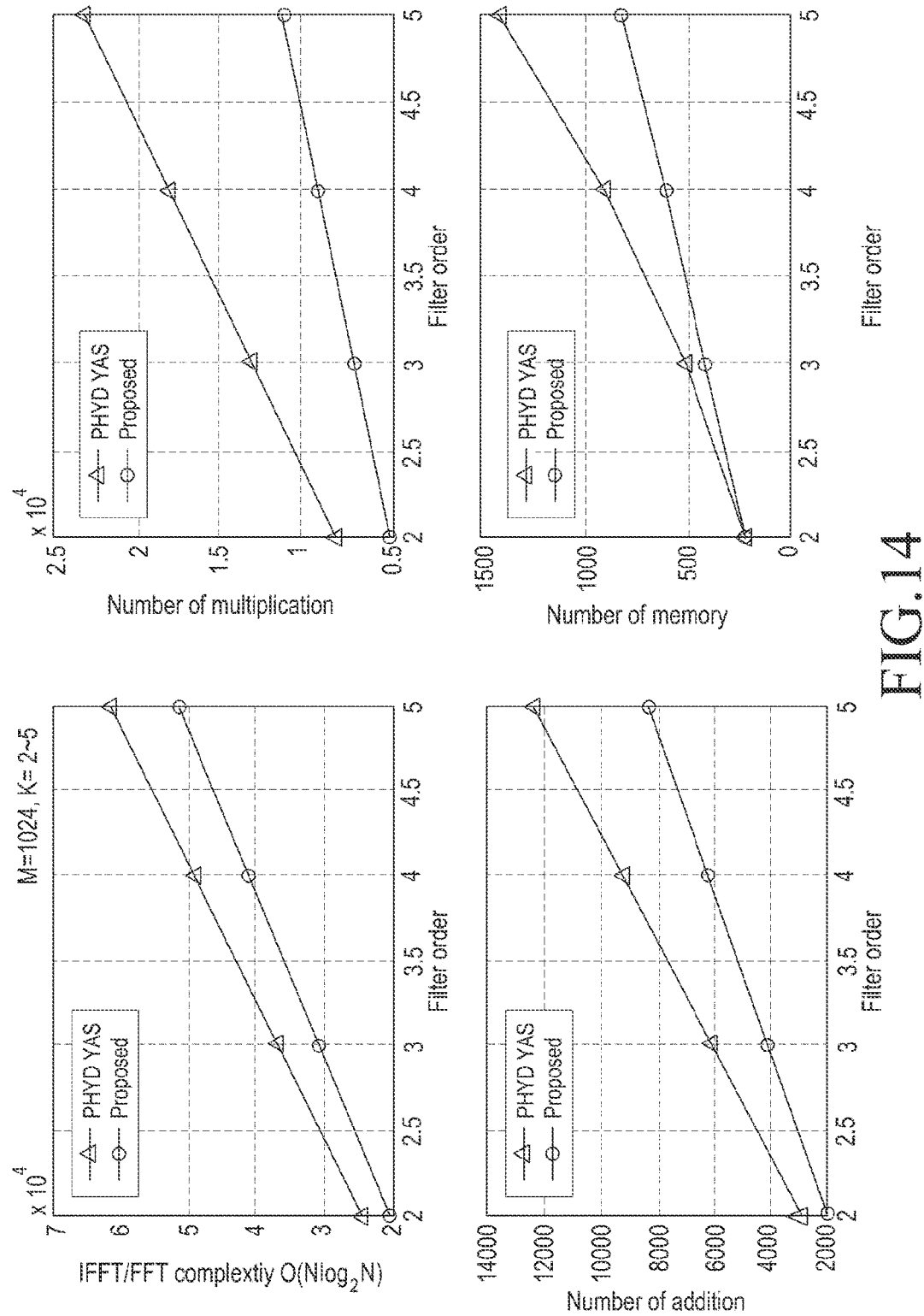
FIGS. 14 and 15 are views illustrating a comparison of a complexity between a configuration of a transceiver in an FBMC system according to the related art and a configuration of a transceiver in an FBMC system according to an embodiment of the present disclosure in a graph form.
Figure 15:
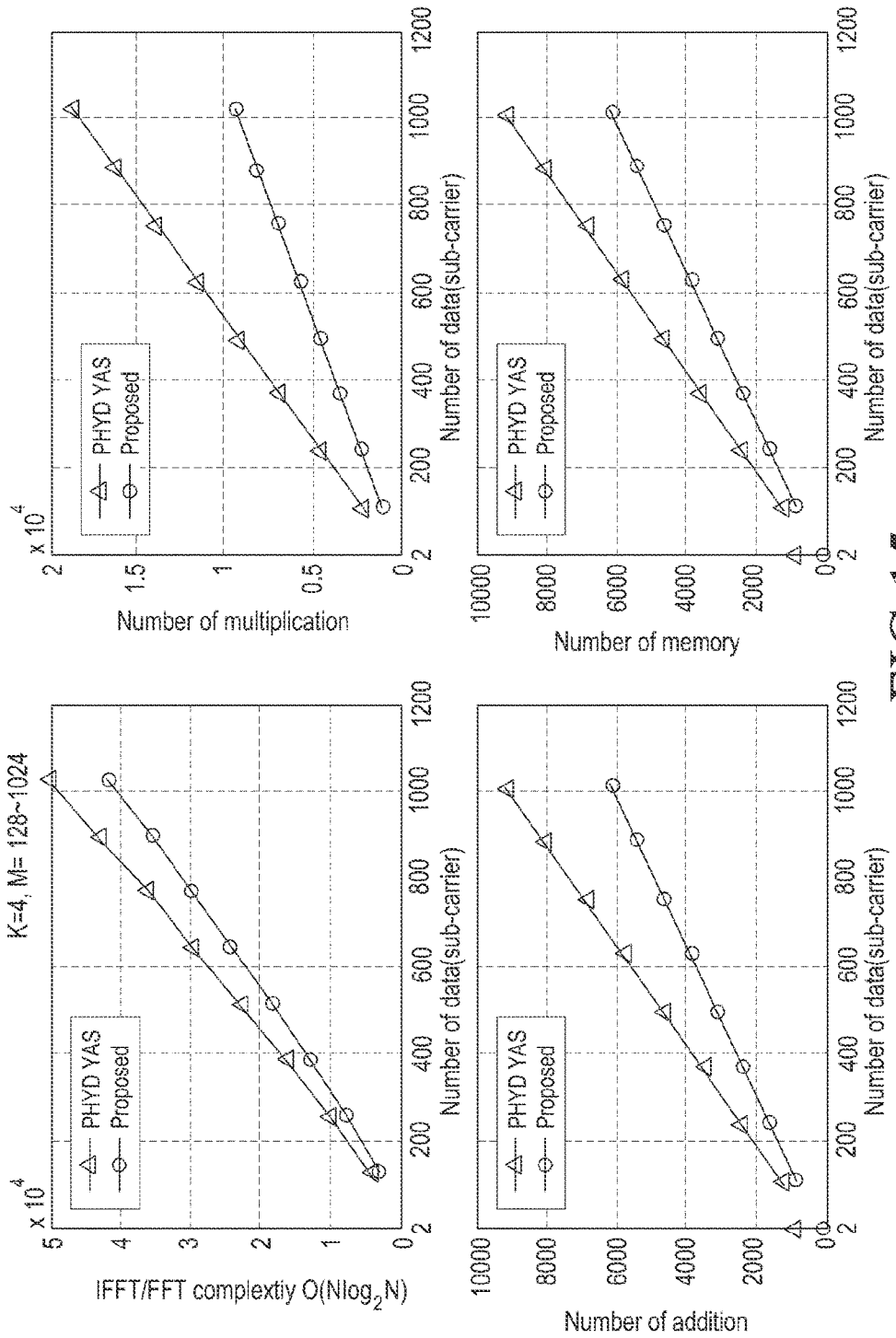

FIGS. 14 and 15 are views illustrating a comparison of a complexity between a configuration of a transceiver in an FBMC system according to the related art and a configuration of a transceiver in a FBMC system according to an embodiment of the present disclosure in a graph form.

Referring to FIG. 14, a size (or length) M of a data block is fixed to 1024 and complexities of four items illustrated in the table of FIG. 13 are compared between the conventional FBMC transmission/reception structure and the FBMC transmission/reception structure according to the embodiment of the present disclosure in an environment where a filter order K is given in a range from 2 to 5. In FIG. 15, a size (or length) M of a data block is provided in a range from 128 to 1024 and complexities of four items illustrated in the table of FIG. 9 are compared between the conventional FBMC transmission/reception structure and the FBMC transmission/reception structure according to the embodiment of the present disclosure in an environment where a filter order K is 4.

Referring to FIGS. 14 and 15, there is only a difference of a graph interval between the complexity in the FBMC transmission/reception structure according to the related art and the FBMC transmission/reception structure according to various embodiments of the present disclosure and the complexity of the FBMC transmission/reception structure according to various embodiments of the present disclosure is significantly lower than the complexity of the FBMC transmission/reception structure according to the related art in any case.

As described above, the FBMC transmission/reception structure according to the related art has a limitation in that a one-tap equalizer in a frequency axis cannot be used or an overall system complexity is increased due to a K-fold increase of sizes of IFFT and FFT.

However, according to various embodiments of the present disclosure, the sizes of IFFT and FFT are fixed to M by implementing filtering through a weighted sum in a time axis through the use of a repetition characteristic of IFFT and FFT. Simultaneously, a receiver side has limited hardware resources in comparison with a transmitter side which can apply the one-tap equalizer in the frequency axis. Accordingly, it is possible to reduce complexities of the transmitter and the receiver and obtain higher compatibility with an OFDM system.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transforming data for transmission in a multi carrier communication system, the method comprising:
    performing, by at least one processor, a serial to parallel (S/P) conversion on input data, the input data being converted into sequential data blocks having a uniform size;
    generating, by the at least one processor, inverse fast fourier transform (IFFT) performed data blocks by performing an IFFT operation on the sequential data blocks;
    storing, by the at least one processor, the IFFT performed data blocks in at least one memory associated with the at least one processor;
    generating, by the at least one processor, multiplied data blocks by multiplying the stored IFFT performed data blocks and time axis filter coefficients;
    summing, by the at least one processor, the multiplied data blocks; and
    transmitting, by a transceiver, a multi carrier signal, the multi carrier signal including serial data, the serial data being generated by performing a parallel to serial (P/S) conversion on parallel data generated from the sum of the multiplied data blocks,
    wherein a size of an IFFT is fixed to the uniform size of the sequential data blocks.

2. The method of claim 1, further comprising:
    outputting the IFFT performed data blocks stored in the at least one memory in parallel.

3. The method of claim 2, wherein a number of the time axis filter coefficients is (K×M) when a number of the IFFT performed data blocks is K and a size of each of the IFFT performed data block is M.

4. The method of claim 1, wherein the size of the IFFT does not vary with a change in a prototype order.

5. A method of transforming data for reception in a multi carrier communication system, the method comprising:
    obtaining, by at least one processor, data blocks from a multi carrier signal received from a transmitter;
    storing, by the at least one processor, the data blocks in at least one memory associated with the at least one processor;
    generating, by the at least one processor, multiplied data blocks by multiplying the stored data blocks and time axis filter coefficients;
    summing, by the at least one processor, the multiplied data blocks;
    generating, by the at least one processor, a fast fourier transform (FFT) performed block by performing, an FFT operation on the sum of the multiplied data blocks; and
    performing, by the at least one processor, an equalization process on the FFT performed block to reconstruct original data.

6. The method of claim 5, wherein the FFT performed block generated by performing the FFT operation have a fixed size.

7. The method of claim 5, further comprising:
    outputting the data blocks stored in the at least one memory in parallel.

8. The method of claim 7, wherein a number of the time axis filter coefficients is (K×M) when a number of the data blocks is K and a size of each data block is M.

9. The method of claim 5, wherein a size of an FFT does not vary with a change in a prototype order.

10. A transmitting device in a multi carrier communication system, the transmitting device comprising:
    a serial to parallel (S/P) converter configured to:
        perform an S/P conversion on input data, the input data being converted into sequential data blocks having a uniform size,
    a filter configured to:
        perform an inverse fast fourier transform (IFFT) operation on the sequential data blocks,
        store the IFFT performed data blocks in at least one memory in the filter,
        generate muliplied data blocks by multiplying the stored IFFT performed data blocks and time axis filter coefficients, and
        sum the multiplied data blocks;
    a parallel to serial (P/S) converter configured to generate serial data by performing a P/S conversion on parallel data generated from the sum of the muliplied data blocks; and
    a transceiver configured to transmit a multi carrier signal including the serial data to a receiving device,
    wherein a size of an IFFT is fixed to the uniform size of the sequential data blocks.

11. The transmitting device of claim 10, wherein the filter comprises:
  at least one processor configured to perform the IFFT operation on the sequential data blocks, a size of the IFFT performed data blocks being identical to a the uniform size of the sequential data blocks;
  a multiplier configured to multiply the time axis filter coefficients and each of the stored IFFT performed data blocks; and
  an adder configured to sum the multiplied data blocks.

12. The transmitting device of claim 11, wherein the at least one processor is further configured to perform the IFFT operation to generate K number of IFFT performed data blocks, each of the K number of IFFT performed data blocks having a size of M.

13. The transmitting device of claim 12, wherein the at least one memory includes (K−1) number of memory blocks.

14. The transmitting device of claim 11, wherein the time axis filter coefficients are (K×M) when a number of the IFFT performed data blocks is K and a size of each IFFT performed data block is M.

15. The transmitting device of claim 11, wherein the at least one processor is further configured to perform the IFFT operation such that the IFFT performed data blocks have a size that does not vary with a change in a prototype order.

16. A receiving device in a multi carrier communication system, the receiving device comprising:
  a transceiver configured to receive a multi carrier signal from a transmitter transmitting device;
  a filter configured to:
    obtain data blocks from the multi carrier signal,
    store the data blocks in at least one memory in the filter,
    generate multiplied data blocks by multiplying the stored data blocks and time axis filter coefficients, and
    sum the multiplied data blocks;
  at least one processor configured to perform a fast fourier transform (FFT) operation on the sum of the multiplied data blocks to generate an FFT performed block; and
  an equalizer configured to perfom an equalization process on the FFT performed block to reconstruct original data.

17. The receiving device of claim 16, wherein the filter comprises:
  an input device configured to receive the multi carrier signal from the transceiver;
  a multiplier configured to multiply the stored data blocks and the time axis filter coefficients; and
  an adder configured to sum the multiplied data blocks.

18. The receiving device of claim 16, wherein the at least one processor is further configured to perform the FFT operation to generate the FFT performed block having a size of M when K number of multiplied data blocks are generated and each of the multiplied data block has a size of M.

19. The s receiving device of claim 18, wherein the memory includes (K−1) number of memory blocks.

20. The receiving device of claim 16, wherein a number of the time axis filter coefficients is (K×M) when a number of the multiplied data blocks is K and a size of each of the multiplied data block is M.

21. The receiving device of claim 16, wherein the at least one processor is further configured to perform the FFT operation such that the FFT performed data block has a size that does not vary with a change in prototype order.

* * * * *